United States Patent [19]
Bartlett et al.

[11] Patent Number: 5,473,684
[45] Date of Patent: Dec. 5, 1995

[54] NOISE-CANCELING DIFFERENTIAL MICROPHONE ASSEMBLY

[75] Inventors: Charles S. Bartlett, Clinton, Md.; Michael A. Zuniga, Fairfax, Va.

[73] Assignee: AT&T Corp., Murray Hill, N.J.

[21] Appl. No.: 230,955

[22] Filed: Apr. 21, 1994

[51] Int. Cl.$^6$ .................................................. H04M 1/00
[52] U.S. Cl. .................. 379/387; 379/389; 379/390; 379/433; 381/71; 381/168; 381/189
[58] Field of Search ................................ 379/387, 433, 379/432, 390, 395, 389; 381/71, 168, 169, 189

[56] References Cited

U.S. PATENT DOCUMENTS

| | | | |
|---|---|---|---|
| 4,584,702 | 4/1986 | Walker, Jr. | 381/71 |
| 4,773,091 | 9/1988 | Busche et al. | 379/433 |
| 4,850,016 | 7/1989 | Groves et al. | 379/433 |
| 5,239,578 | 8/1993 | Regen et al. | 379/387 |
| 5,260,998 | 9/1993 | Takagi | 379/433 |
| 5,341,420 | 8/1994 | Hollier et al. | 379/433 |
| 5,381,473 | 1/1995 | Andrea et al. | 379/433 |

OTHER PUBLICATIONS

"Second–Order Gradient Noise–Cancelling Microphone," A. J. Brouns, CH1610–5/81/0000–0786 1981 IEEE, pp. 786–789.

"A Second–Order Gradient Noise Canceling Microphone Using a Single Diaphragm," W. A. Beaverson and A. M. Wiggins, Journal of the Acoustical Society of America, vol. 22, No. 5, Sep. 1950, pp. 592–601.

"Adaptive Noise Cancelling: Principles and Applications," B. Widrow et al., Proc. IEEE 63 (Dec. 1975), pp. 1692–1716.

Primary Examiner—Jeffery A. Hofsass
Assistant Examiner—Jacques M. Saint-Surin
Attorney, Agent, or Firm—Martin I. Finston

[57] ABSTRACT

Improved microphone performance is achieved by configuring a second-order derivative microphone assembly in such a way that radially divergent near-field input produces a microphone response proportional to a first-order spatial derivative of the acoustic pressure field.

20 Claims, 8 Drawing Sheets

NOISE-CANCELING DIFFERENTIAL MICROPHONE ASSEMBLY

BACKGROUND OF THE INVENTION

Telephone handsets usually are fitted with omnidirectional microphones, which offer little discrimination against background noise. As a consequence, noise may be transmitted together with the speaker's voice, and interfere with the far end party's ability to understand what is being said.

Noise cancelling microphones have been proposed as a possible solution to this problem. These microphones, sometimes referred to as pressure gradient or first-order differential (FOD) microphones, have a vibratable diaphragm which is acted upon by the difference in sound pressure between the front and back sides of the diaphragm. An electrical signal is thus produced which is proportional to the gradient in the sound pressure field at the microphone. At the telephone mouthpiece, the acoustic field due to ambient noise will generally have a smaller pressure gradient than the acoustic field due to the speaker's voice. As a consequence, the voice will be preferentially sensed and transmitted relative to the ambient noise.

U.S. Pat. Nos. 4,584,702, 4,773,091 and 4,850,016 describe designs for incorporating a pressure gradient microphone into a telephone handset. Although useful, these designs fail to take into account all of the acoustic spatial information that might be used to enhance the speaker's voice relative to ambient noise. Moreover, the frequency response of pressure gradient microphones generally causes a change in the frequency content of the transmitted voice that becomes more noticeable as the distance from the speaker's mouth is increased. This tendency is readily offset by electronic frequency shaping. However, the use of electronic frequency shaping tends to partially counteract the ability of the microphone to reject noise. Thus, if frequency shaping is to be used, it is desirable to have a microphone with improved noise-rejection characteristics so that some marginal loss of performance can be tolerated.

In order to achieve still better noise rejection, practitioners in the microphonic art have proposed the use of second order differential (SOD) microphones, which measure a spatial second derivative of the acoustic pressure field. A ratio can be taken of two such second derivatives, the numerator corresponding to the speaker's voice (near the lips), and the denominator corresponding to the ambient noise field. Generally, this ratio will be significantly greater than the analogous ratio of first derivatives (such as would characterize the performance of a FOD microphone). Consequently, a SOD microphone is expected to exhibit much greater sensitivity to a speaker's voice relative to ambient noise than a FOD microphone.

SOD microphone designs have been described, for example, in A. J. Brouns, "Second-Order Gradient Noise-Cancelling Microphone," *IEEE International Conference on Acoustics, Speech, and Signal Processing* CH1610-5/81 (May 1981) 786–789, and in W. A. Beaverson and A. M. Wiggins, "A Second-Order Gradient Noise Canceling Microphone Using a Single Diaphragm," J. Acoust. Soc. Am. 22 (1950) 592–601. In general, these designs are configured to measure a second order derivative of the acoustic field near the speaker's lips, but they do not optimally exploit the spherical wave nature of the speaker's voice field to maximize sensitivity to the speaker's voice. As a consequence, the voice response of prior art SOD microphones is very sensitive to the distance R from the speaker's lips. Specifically, the voice response is expressible as the sum of three terms: a frequency-independent term inversely proportional to $R^3$, a term proportional to the angular frequency ω and inversely proportional to $R^2$, and a term proportional to $\omega^2$ and inversely proportional to R. That is, with increasing distance from the lips, prior art SOD microphones very soon exhibit an undesirable, $\omega^2$ component of the near-field voice response. This effect tends to reduce the net transmitted voice power, and to make the voice sound deficient in low frequencies.

SUMMARY OF THE INVENTION

We have invented an improved SOD microphone that overcomes the deficiencies of the prior art by responding to the speaker's voice like a FOD microphone (i.e., with respect to the dependence of voice response on distance from the speaker's lips), but responding to the far field noise like a SOD microphone. As a consequence, the inventive microphone is significantly less sensitive than prior art SOD microphones to positioning with respect to the speaker's lips, and it gives better voice quality than prior art SOD microphones while maintaining comparable far-field noise discrimination.

A further advantage of our microphone is that it can be provided in a compact design that is readily incorporated in the mouthpiece of a telephone handset with little modification to the existing structure. This incorporation can be achieved in such a way that only the acoustic field exterior to the mouthpiece is sensed to any significant degree, and diffraction and wind-noise effects are no greater than with conventional microphones.

In a broad sense, the invention involves apparatus comprising a transducer for converting acoustic signals, emitted by a source, to electrical output signals in the presence of acoustic noise; and further comprising a platform for maintaining the transducer at a substantially constant distance from the source along an axis to be referred to as the major axis. The transducer is adapted to respond to a second spatial derivative of the acoustic pressure field. Accordingly, it is referred to herein as a "second-order differential microphone," or "SOD."

The operation of the invention is conveniently described with reference to a minor axis perpendicular to the major axis. The transducer includes means for sensing the pressure field at respective first and second locations that are separated at least by a displacement along the minor axis. The first sensing means produce a first output signal proportional to the first spatial derivative of the pressure field, along the minor axis, at the first location. Similarly, the second sensing means produce a second output signal proportional to the first spatial derivative of the pressure field, along the minor axis, at the second location.

The transducer further comprises means for combining the first and second output signals into a net output signal which represents the difference between the first and second output signals. The first and second locations are chosen in such a way that radially divergent acoustic signals emitted by the source will contribute first and second output signals that mutually reinforce in the net output signal, and are proportional to the first spatial derivative of the pressure field along the minor axis.

In one embodiment, the transducer comprises an array of two FOD microphones, separated by a distance d along the minor axis. The FOD microphones are situated within the platform in such a way that in use, they will be on the same side of the source and approximately equidistant from it. The membrane of each FOD microphone is substantially perpendicular to the minor axis, so that each microphone is individually sensitive to the first spatial derivative of the pressure field along the minor axis.

DETAILED DESCRIPTION

Figure 1:
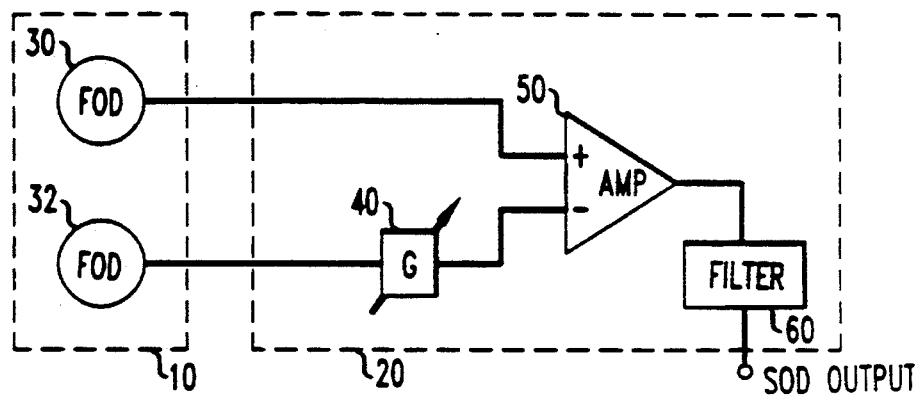
FIG. 1 is a block diagram of a microphone assembly and associated electronics according to the invention in one embodiment.

Turning to FIG. 1, the invention in a preferred embodiment includes a microphone assembly 10 and electronics package 20. Within the electronics package, the outputs of first-order differential (FOD) microphones 30, 32 are subtracted, one from the other, by differencing amplifier 50. Before this subtraction, the output of, e.g., FOD microphone 32 is advantageously passed through element 40 to equalize the outputs of the two FOD microphones. This element may be, for example, a variable-gain amplifier or a filter.

The purpose of element 40 is to assure, within practical limits, that the microphones respond to identical acoustic input with identical sensitivity and identical phase response. Generally, a variable-gain amplifier will suffice of the respective microphone responses differ by a gain offset that is independent of frequency in the range of interest. An active filter may be desirable if the imbalance in gain or phase-response is frequency-dependent.

In some cases, changing environmental conditions such as temperature and humidity may affect the respective microphone responses unequally. In such cases, it may be advantageous for element 40 to perform its balancing function by adaptive filtering, as described in greater detail below.

It should be noted in this regard that for microphones 30 and 32 we currently prefer to use mass-produced, commercially available, electret microphones. These microphones are readily available in large lots that are well matched in phase response and that have a fixed gain offset, independent of frequency (within the range of interest) that is typically within ±4 dB.

The output of differencing amplifier 50 is optionally passed through voice-shaping electronic filter 60 to make the frequency response of the microphone assembly match a desired characteristic, such as the frequency response of an omnidirectional microphone.

Figure 2:
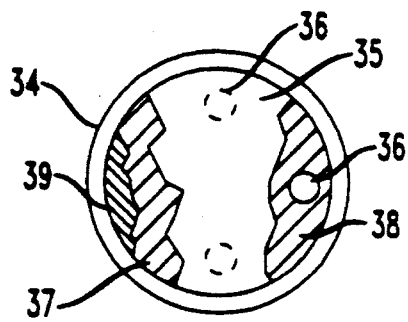
FIG. 2 is a partially cut-away view of a conventional first order differential microphone useful as a component of the inventive microphone assembly, in one embodiment.

Turning to FIG. 2, exemplary FOD electret microphone 34 includes diaphragm 35 enclosed between front cover 37 and back cover 38. Both sides of the diaphragm sense the acoustic pressure field. This is facilitated by air holes 36 in the front and back covers. Typically, a felt cover layer 39 overlies front cover 37.

As is well-known in the art, this bilateral sensing results in an output proportional to the acoustic velocity field perpendicular to the face of the diaphragm.

Figure 3:
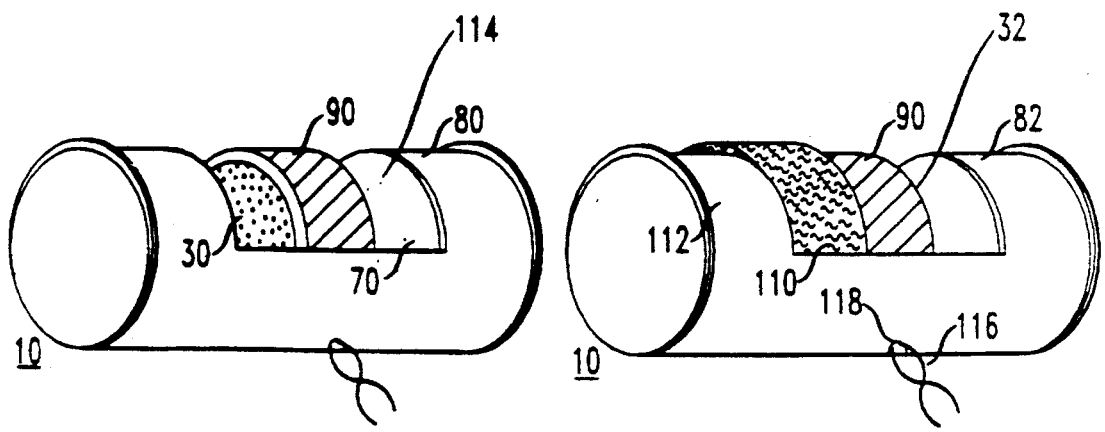
FIG. 3 is a perspective view of a second order differential microphone assembly according to the invention, in one embodiment.

Turning to FIG. 3, each of microphones 30 and 32 of microphone assembly 10 is mounted within a respective one of cartridges 80, 82, each of which defines a partial enclosure having ports 70 for admitting the acoustic pressure field so that it can be sensed on both sides of the microphone diaphragm. Each cartridge is made from a material of sufficient rigidity to substantially isolate the enclosed volume sensed by the microphone from the surrounding mouthpiece cavity of the handset (or other platform), and from vibrations transmitted through the platform. By way of example, we have successfully used cartridges that, with the ports sealed, will reduce the detected sound level by about 20 dB or more.

We have built working prototypes in which the cartridges are made from brass, 0.008 inch (0.20 mm) thick. However, for a mass-produced embodiment of the invention, we believe it would be preferable, for economic reasons, to use a polymeric material such as hard plastic or hard rubber.

It is desirable to subdivide the interior of the cartridge into a pair of mutually acoustically isolated chambers, one in front of the microphone, and one behind it. This is achieved, for example, by surrounding the microphone with a mounting ring 90 that fits tightly against the microphone body and also seals tightly against the inner wall of the cartridge. Such a mounting ring is exemplarily made from rubber.

In addition, a layer 110 of an appropriate foam material, such as an open-cell, 65-pore, polyurethane foam, is usefully interposed between the acoustic signal source and each of the microphones for reducing pickup of acoustic turbulence when a human operator speaks into the microphone assembly. Such a foam layer is advantageously placed over each port 70. Alternatively, foam bodies can be placed, e.g., directly within the ports, or within the cartridge.

In currently preferred embodiments, each cartridge 80, 82 is conformed as a right circular cylinder having a lengthwise slot along the top (i.e., along the side intended to face the speaker or other source of acoustic signals) that extends approximately the full length of the cartridge. The microphone and its mounting are placed within the cartridge in such a way as to form a partition that subdivides the interior of the cartridge into two approximately equal parts 112, 114. The microphone, together with its mounting, also subdivides the lengthwise slot, and in that way defines each port 70 as a subdivided part of the slot.

Electrical leads 116 from each microphone are readily directed out of each cartridge through a small hole 118 formed, e.g., in the side of the cartridge opposite the ports. Within each of these hobs, the space surrounding the leads is desirably filled with an airtight seal in order to reduce acoustical leakage.

By way of example, we have successfully used cartridges of 0.008-inch brass that are shaped as cylinders 0.55 inch long and 0.38 inch in inner diameter. The corresponding microphones were electric microphones 0.38 inch in diameter, and having a front-to-back length of 0.2 inch.

In at least some embodiments, it is advantageous to place the two cartridges end-to-end in contact or at least in close juxtaposition. This arrangement, together with symmetric sizes and placement of the ports in each cartridge, helps to ensure that within each cartridge, the two sides of the corresponding diaphragm will sample the acoustic field equivalently. As a result, microphone assembly 10 can exhibit second-order differential microphone behavior similar to that which would result if FOD microphones 30, 32 were operated in a free-field environment.

It should be noted that because microphone assembly 10 can be acoustically isolated from the platform upon which it is mounted, it is easily adapted to a variety of application environments.

It is well known that for many, typical microphonic applications, a speaker's voice behaves to a significant extent as though emanating from a theoretical point source. Accordingly, the geometric arrangement of FIG. 4 is the currently preferred arrangement when microphone assembly 10 is mounted on a communication platform for operation by a human speaker.

Figure 4:
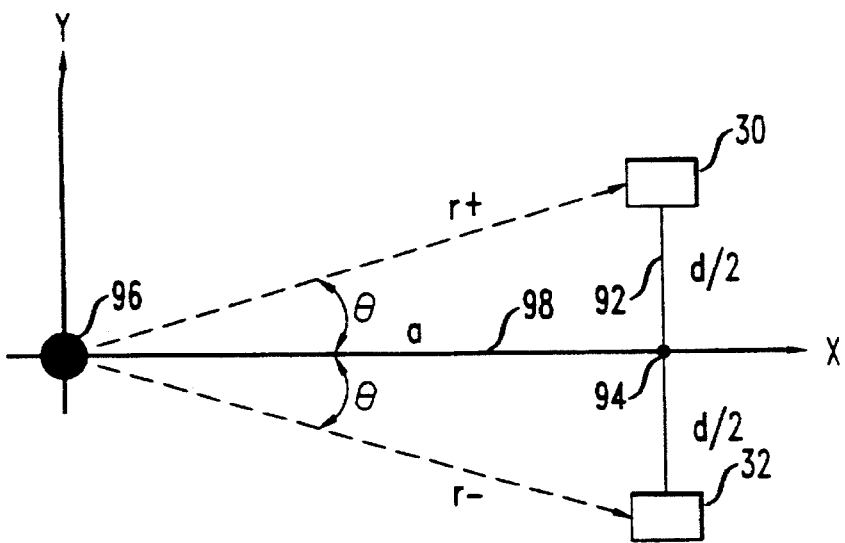
FIG. 4 is a schematic diagram showing a preferred geometric arrangement of the second order differential microphone assembly relative to a near field source such as a user's mouth.

As shown in FIG. 4, FOD microphones 30, 32 are separated by a distance d along line segment 92, which will be referred to as the "minor axis." The midpoint 94 of the minor axis is a distance a from theoretical point source 96 along axis 98, which Will be referred to as the "major axis." The FOD microphones preferably lie at equal radii $r^+$, $r^-$ from source 96. It is clear that if the microphones are equidistant from the source, the major and minor axes are perpendicular, and each of radii $r^+$ and $r^-$ makes an angle θ with the major axis. Significantly, the angle θ is less than 90°; i.e., both microphones lie on the same side of the source.

The membrane of each microphone is oriented substantially perpendicular to the minor axis (i.e., perpendicular to the y-axis in the representation of FIG. 4). As a result, each membrane is sensitive (within practical limits) only to that component of the acoustic velocity field directed along the minor axis.

Because the acoustic signal is radially divergent, this velocity-field component has one sign at $r^+$, and the opposite sign at $r^-$. Consequently, the difference between the electrical outputs of the respective FOD microphones will include a mutually reinforcing combination of the respective microphone responses to these velocity-field components. That is, the magnitudes of the velocity-field components directed along the minor axis will add constructively in the combined microphone output.

The magnitude of the output from the inventive SOD microphone assembly can be compared with the magnitude of the output from a single FOD microphone situated at point 94, with its diaphragm oriented perpendicular to the major axis. Theoretically, the SOD:FOD ratio of these magnitudes (when the major and minor axes are mutually perpendicular) is given by the expression:

$$\text{Ratio} = \left( \frac{4z^2[1 + (ka)^2(1 + z^2)]}{[1 + (ka)^2][1 + z^2]^3} \right)^{1/2}$$

where z=d/(2a), k=ω/c, ω to is the angular frequency and c is the speed of sound in air.

Figure 5:
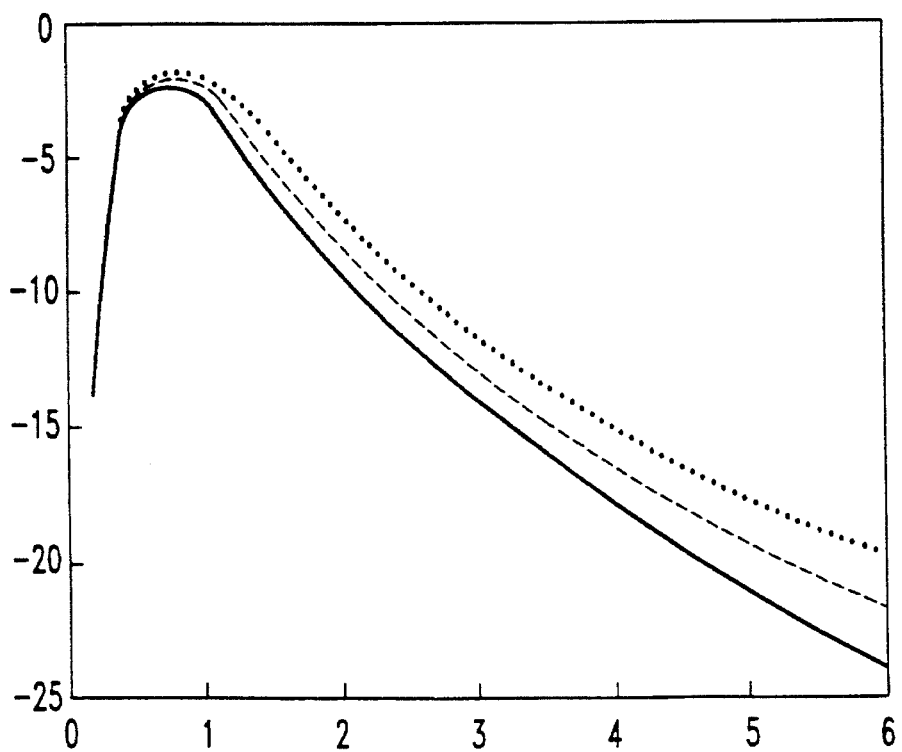
FIG. 5 is a theoretical plot showing how the output of a SOD assembly depends on the separation between the two FOD microphones. The vertical axis represents the magnitude of the SOD output, relative to the output of a conventionally oriented FOD microphone.

This function is plotted in FIG. 5 versus the normalized distance d/(2a), for frequencies of 500 Hz, 1000 Hz, and 1500 Hz. It is evident that to an excellent approximation (provided the distance a, in units of one wavelength at the given frequency, is much smaller than $1/2\pi$), the SOD output is maximal (relative to the hypothetical FOD output), without regard to frequency, when d=1.4a. This design formula may be used to optimize the geometric configuration of the microphone assembly for a particular communications device based upon the expected distance between the assembly and the user's lips.

It is evident from FIG. 5 that when microphone assembly 10 is optimally configured as described, its sensitivity in the near field is nearly as large as a FOD microphone placed at the midpoint of the minor axis. However, the far-field noise rejection of the SOD will be substantially enhanced relative to the FOD microphone because the second spatial derivative of the acoustic pressure field is smaller than its first spatial derivative in typical diffuse sound environments.

Thus, a significant improvement in microphone performance is achieved by configuring a microphone assembly in such a way that when them is radially divergent near-field input, the corresponding component of the second-order differential output is proportional to the first-order spatial derivative. The configuration of FIG. 4 is a currently preferred configuration. However, the invention as we envisage it is meant to encompass other microphone configurations that also embody this conceptual approach to improving microphone performance. For example, we believe that as an alternative to the two-diaphragm implementation of FIG. 4, it is possible to achieve qualitatively similar improvements in microphone performance through the use of a single-diaphragm configuration. The use of single diaphragms to achieve first- and second-order differential operation is described generally in the journal article by Beaverson and Wiggins, cited above.

As noted, it is advantageous to include a balancing element such as a variable gain amplifier to equalize the outputs of microphones 30, 32. The appropriate setting of, e.g., a variable gain may be determined during production. Alternatively, an adaptive algorithm can be used to balance the microphones adaptively, each time they are used. An appropriate algorithm for this purpose is described, for example, in B. Widrow et at., "Adaptive Noise Cancelling: Principles and Applications," *Proc. IEEE* 63 (December 1975) 1692–1716.

Figure 6:
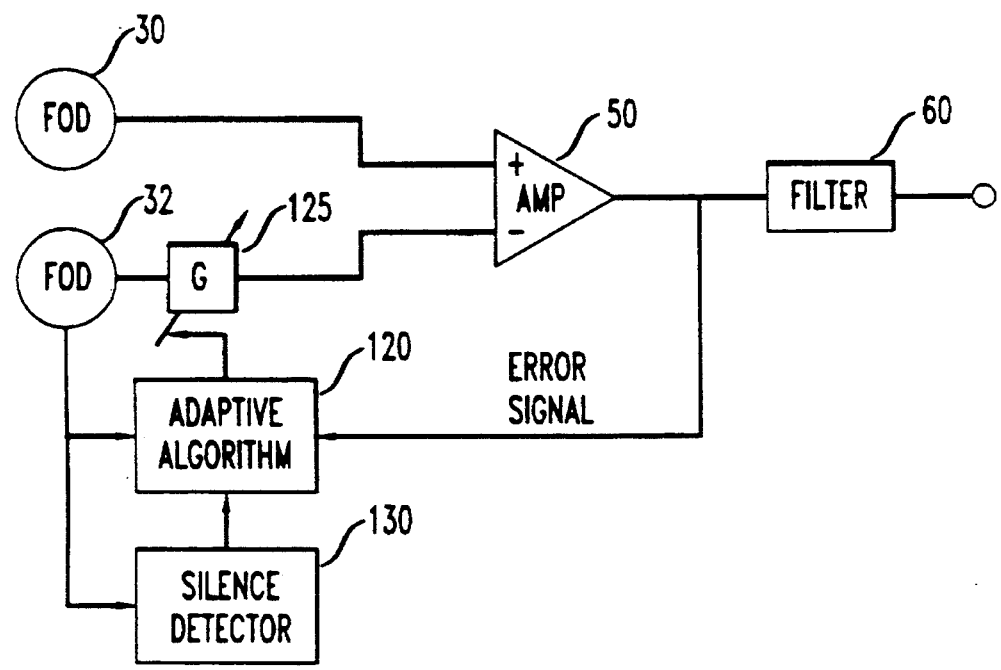
FIG. 6 is a block diagram of the invention in one embodiment, including a component for adaptively equalizing the two FOD microphones.

Turning to FIG. 6, adaptive algorithm 120 is implemented by, for example, a digital signal processor whose output is used, in effect, to adjust variable gain or adaptive filter 125 in order to minimize the (subtractively) combined outputs of microphones 30, 32.

It is desirable to adapt only when them is no speech present; i.e., when the human speaker (or other acoustic signal source) is quiescent. Accordingly, a component 130 is advantageously provided for detecting when the signal source is quiescent. Such a component is also exemplarily implemented by a digital signal processor. The output of component 130 sets the adaptation parameter to a non-zero value (i.e., permits adaptation to take place) when the output of, e.g., microphone 32 is less than a predetermined threshold, which is taken as an indication that the microphone is receiving only far field noise. By way of example, we have found that the speaker's sound level at the microphones is typically about 10–15 dB higher than that due to the ambient noise level. Thus, a threshold can (at least initially) be set with reference to this quantity.

Figure 7:
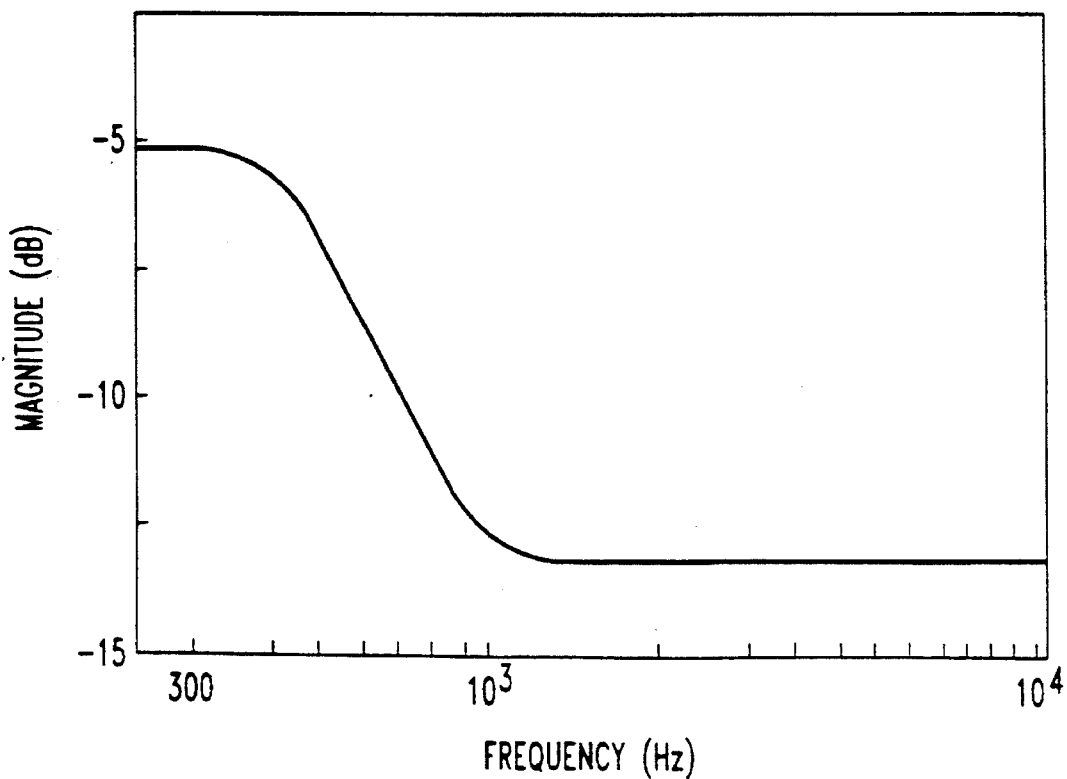
FIG. 7 is a graph of the frequency response of a typical voice-shaping filter useful for matching the near-field output of the inventive second-order differential microphone to that of an omnidirectional microphone.

The near-field frequency response of SOD microphone assembly 10 is nearly the same as that of a FOD microphone, even without the use of a voice-shaping filter. Relative to an omnidirectional microphone, however, the near-field response of the SOD assembly increases with frequency. This frequency dependence is readily compensated using voice-shaping filter 60. A typical curve of frequency response for such a filter is shown in FIG. 7.

Figure 8:
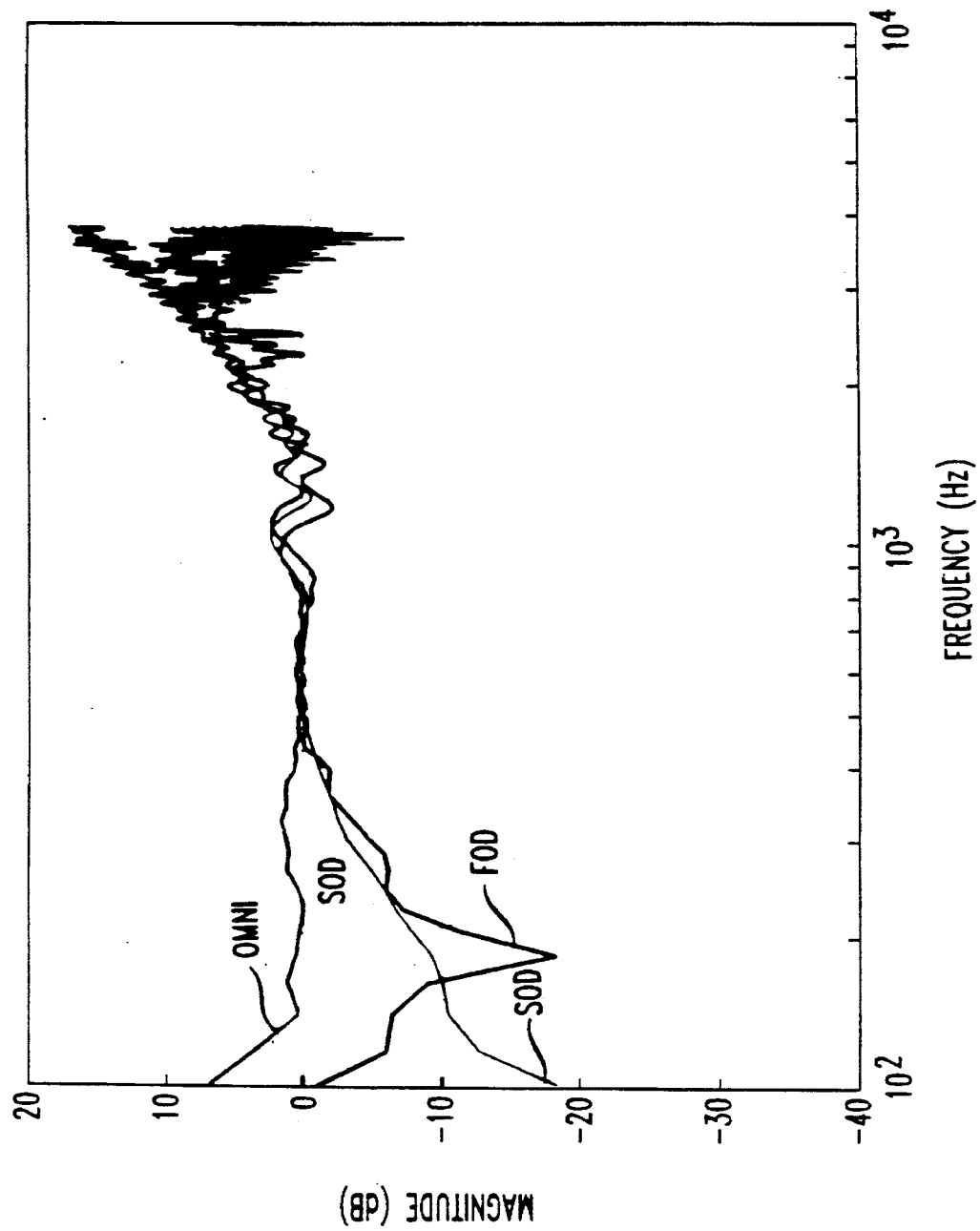
FIG. 8 is a graph that compares the near-field sensitivities of SOD, FOD, and omnidirectional microphones. Plotted is the frequency response of a microphone of each type.
Figure 9:
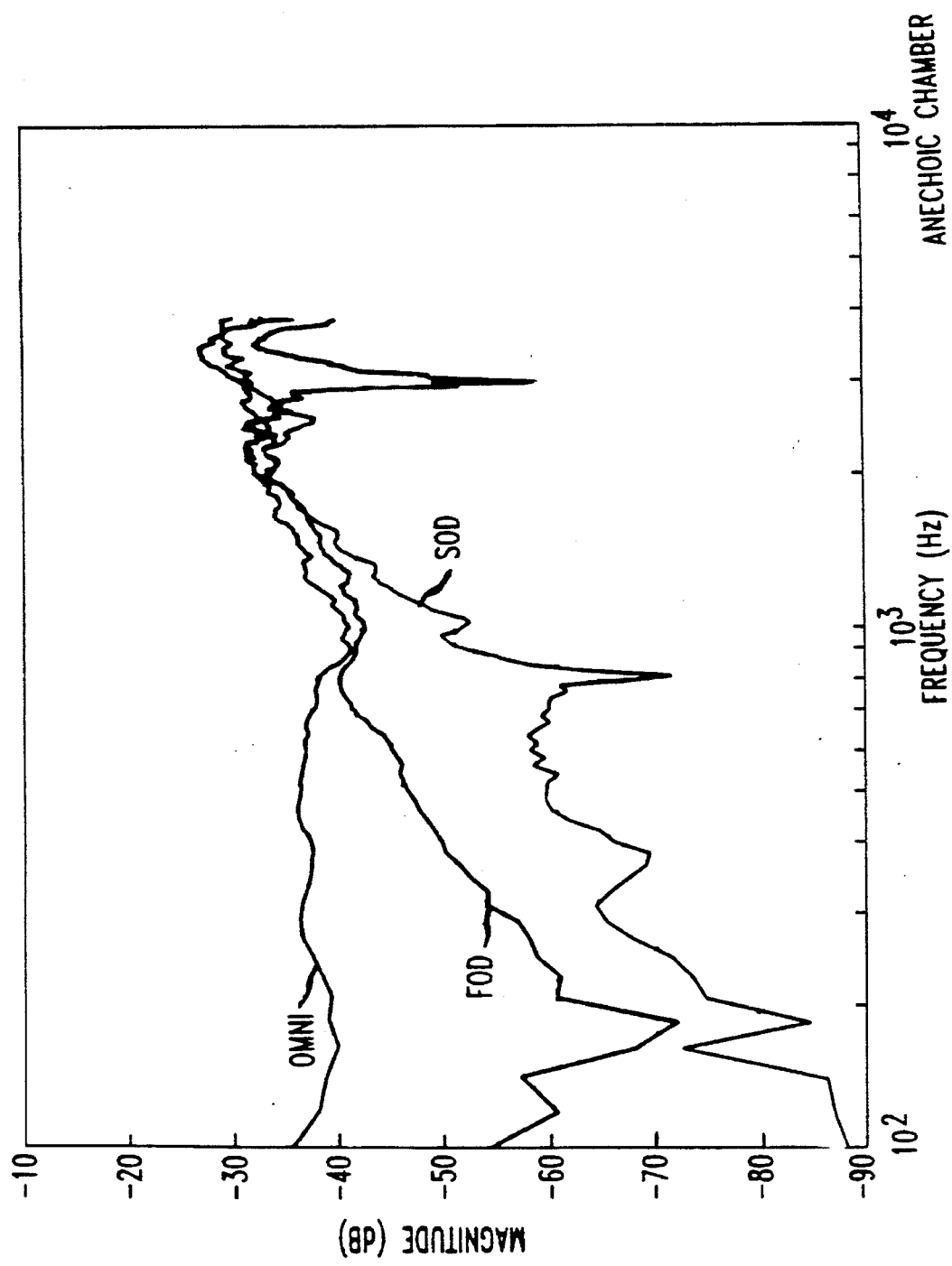
FIG. 9 is a graph that compares the far-field sensitivities of the microphones of FIG. 8.

The sensitivity plots of FIGS. 8 and 9 represent the near-field (FIG. 8) and far-field (FIG. 9) responses of the respective microphones relative to a calibrated Bruel and Kjaer microphone placed 1 cm from the lips of a Bruel and Kjaer head and torso simulator. The simulator was the acoustic source in each case.

FIG. 8 shows that for every frequency in the range 250–3500 Hz, the near-field response of an exemplary SOD microphone assembly fell within 5 dB of the FOD microphone included for comparison, and over most of that range, the response was within 2 dB. These results indicate that in the near field, the SOD assembly behaved substantially like a FOD microphone.

FIG. 9 shows that over a frequency range of 100–1000 Hz, the SOD assembly was less sensitive to far-field stimulation than the FOD microphone by a margin, over most of that range, of 10 dB or more. FIG. 9 also shows that on the average, the sensitivity of the SOD assembly to low-frequency noises fell off more rapidly (with decreasing frequency) than that of the FOD microphone. This relatively steep, $\omega^2$, far-field frequency dependence is generally deskable because it helps to reject noise from low-frequency sources such as crowds and vehicular traffic.

Figure 10:
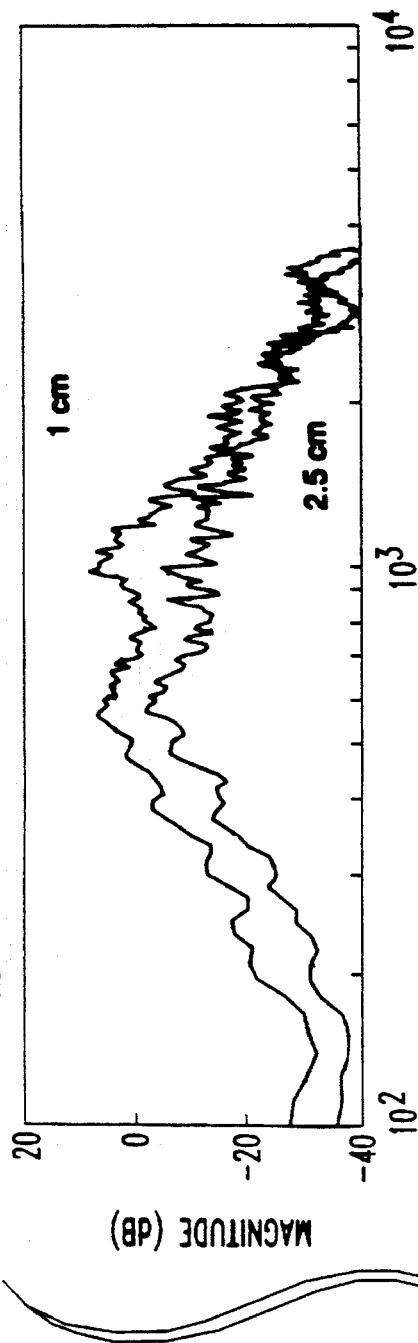
FIG. 10 is a graph that compares the FOD and SOD microphones with respect to the effect of source-to-microphone separation on near-field sensitivity. Plotted for a microphone of each type is the frequency response at two different separations from the source.
Figure 10:
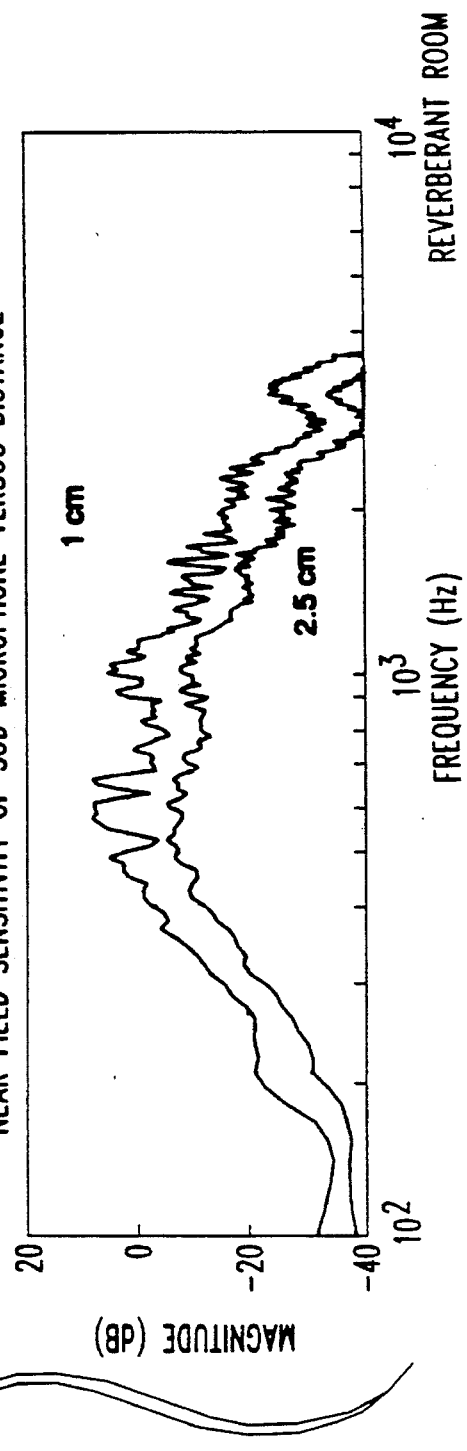

FIG. 10 shows the effect on near-field sensitivity of shifting the source-to-microphone distance from 1 cm to 2.5 cm. It is evident from the figure that the relative change for the SOD assembly was very similar to the relative change for the FOD microphone. This supports our observation that in the near field, the acoustic characteristics of the SOD assembly are similar to those of a FOD microphone.

Figure 11:
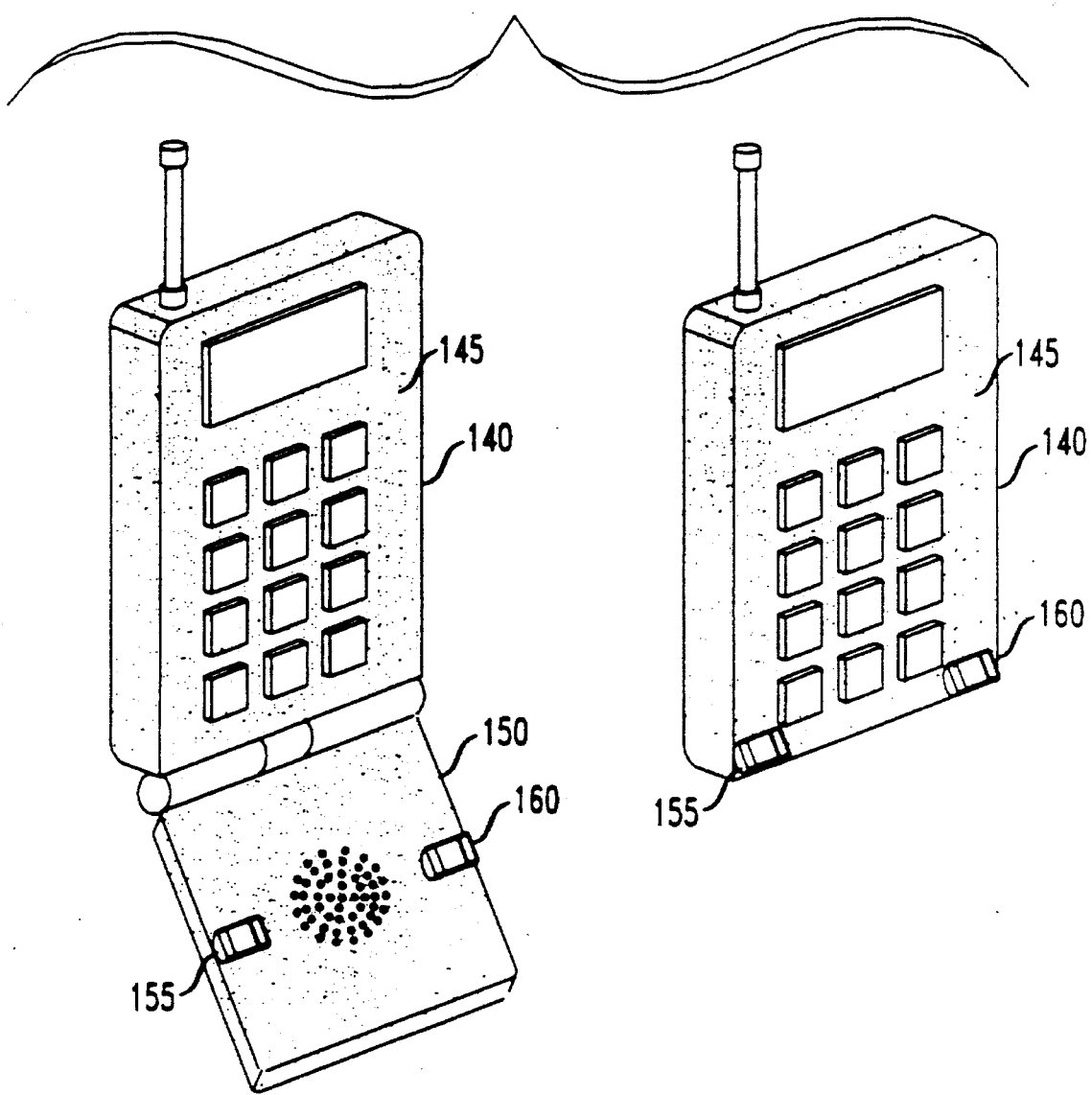
FIG. 11 is a perspective view of a cellular telephone handset incorporating a SOD microphone assembly according to the invention in one embodiment.

The inventive microphone assembly is readily incorporated in communication platforms of various kinds. By way of example, FIG. 11 illustrates the incorporation of the microphone assembly into a cellular handset 140. The microphone assembly is readily incorporated either in the base portion 145 of a handset, or, alternatively, in a hinged, flip portion 150 if such a portion is present. Typically, the cartridge 155 will occupy a recess within the body of the handset, and ports 160 will be exposed to the operator's voice. As discussed above, foam layers or bodies (not shown) will typically be included in order to inhibit the pickup of turbulence.

Figure 12:
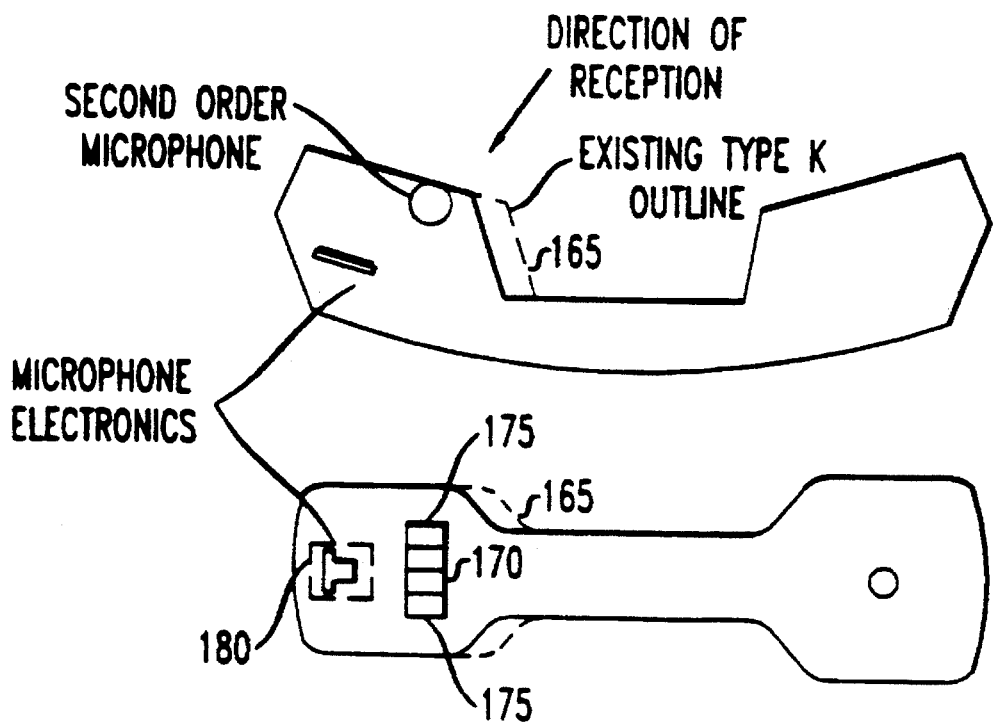
FIG. 12 is a perspective view of a telephone handset incorporating a SOD microphone assembly according to the invention in one embodiment.

Another exemplary platform is a telephone handset, as depicted in FIG. 12. The broken line 165 shows the outer contour of a standard, Type K handset. The solid contour of the figure represents a modified shape that permits the microphone assembly to be brought closer to the speaker's lips. Visible in the figure are cartridge 170, ports 175, and circuit board 180 for the microphone electronics package.

Figure 13:
FIG. 13 is a perspective view of a headset including a boom that incorporates a SOD microphone assembly according to the invention in one embodiment.

FIG. 13 shows yet another exemplary platform, namely boom 185, which will typically be incorporated in a helmet or operator's headset.

We claim:

1. Apparatus comprising a transducer for converting acoustic signals, emitted by a source, to electrical output signals in the presence of acoustic noise; and further comprising a platform for maintaining the transducer at a substantially constant distance from the source; wherein the transducer is adapted to respond to a second-order spatial derivative of the pressure field associated with at least some acoustic fields, CHARACTERIZED IN THAT the transducer comprises:

a) two first-order differential microphones separated by a distance d, the microphones so situated within the platform that in use, they are on the same side of the source and approximately equidistant therefrom, and each microphone including a membrane having a substantially perpendicular orientation relative to a straight line drawn between the two microphones; and b) differencing means for receiving an electrical output signal from each of the two microphones, and for producing, in response thereto, an electrical difference signal proportional to the difference between the respective microphone output signals.

2. Apparatus in accordance with claim 1, further comprising means for balancing the sensitivities of the two microphones.

3. Apparatus in accordance with claim 2, wherein the balancing means comprise a variable gain amplifier.

4. Apparatus in accordance with claim 2, wherein the balancing means comprise a filter.

5. Apparatus in accordance with claim 2, wherein the balancing means comprise an adaptive filter and means for adjusting the filter coefficients such that the electrical difference signal excited by ambient noise is minimized.

6. Apparatus in accordance with claim 5, wherein the balancing means further comprise automatic means for discriminating between states in which the source is emitting acoustic signals and states in which the source is quiescent, and means for permitting the adaptive filter to adapt only when the source is quiescent.

7. Apparatus in accordance with claim 1, wherein:

a) the platform is so conformed as to establish an approximate, expected distance a between the transducer and the source; and b) the distance d between the microphones is adapted such that the ratio d/a is near a value that optimizes the theoretical sensitivity of the transducer relative to a hypothetical, single, first-order differential microphone co-located with the transducer and oriented for maximum sensitivity.

8. Apparatus in accordance with claim 7, wherein the ratio d/a is approximately 1.4.

9. Apparatus in accordance with claim 1, wherein the first-order differential microphones are electret microphones.

10. Apparatus in accordance with claim 1, wherein the transducer further comprises a respective cartridge for housing each of the two microphones, each cartridge mounted within the platform, wherein:
  a) each cartridge comprises a wall defining an enclosure therewithin;
  b) each wall comprises a material sufficiently rigid to provide at least partial acoustic isolation between the enclosure and the platform;
  c) each of the two microphones is fixedly mounted within the enclosure of its respective cartridge; and
  d) the wall of each cartridge is perforated such that both sides of the corresponding microphone membrane can sample the acoustic pressure field equally.

11. Apparatus in accordance with claim 10, wherein: each cartridge is conformed as a right circular cylinder having a longitudinal axis; each respective cartridge wall is perforated by a slot extending parallel to said axis for approximately the entire length of the cylinder, said slot oriented to face the source when the transducer is in use; and each microphone is mounted so as to bisect its respective enclosure and slot.

12. Apparatus in accordance with claim 10, wherein each cartridge wall comprises a material selected from the group consisting of: hard plastic, hard rubber, and brass.

13. Apparatus in accordance with claim 10, further comprising means for adjusting the distance d between the microphones.

14. Apparatus in accordance with claim 1, further comprising a voice-shaping filter for changing the frequency content of the electrical difference signal.

15. Apparatus in accordance with claim 1, wherein the platform comprises a telephone handset.

16. Apparatus in accordance with claim 1, wherein the platform comprises the boom of a communication headset.

17. Apparatus in accordance with claim 1, wherein the platform comprises a foldable telephone handset having a base and a hinged flip portion, and the transducer is mounted in the flip portion.

18. Apparatus in accordance with claim 1, wherein the platform comprises a foldable telephone handset having a base and a hinged flip portion, and the transducer is mounted in the base.

19. Apparatus comprising a transducer for converting acoustic signals, emitted by a source, to electrical output signals in the presence of acoustic noise; and further comprising a platform for maintaining the transducer at a substantially constant distance from the source along an axis to be referred to as the major axis; wherein the transducer is adapted to respond to a second-order spatial derivative of the pressure field associated with at least some acoustic fields, CHARACTERIZED IN THAT
  a) the transducer comprises means for sensing the pressure field at respective first and second locations separated at least along a minor axis perpendicular to the major axis;
  b) the sensing means are adapted to produce first and second output signals proportional to the first spatial derivative of the pressure field, along the minor axis, at the first and second locations, respectively;
  c) the transducer further comprises means for combining the first and second output signals into a net output signal representing the difference between the first and second output signals; and
  d) the first and second locations are so chosen that radially divergent acoustic signals emitted by the source contribute, to the net output signal, mutually reinforcing first and second output signals that are proportional to the first spatial derivative of the pressure field along the minor axis.

20. A method for converting acoustic signals, emitted by a source, to electrical output signals in the presence of far-field acoustic noise, the method comprising the steps of:
  a) sensing an acoustic pressure field at respective first and second locations;
  b) producing first and second electrical output signals, each said output signal proportional to a first spatial derivative of the pressure field at a respective one of said locations; and
  c) combining the first and second output signals into a net output signal representing the difference between the first and second output signals, such that the net output signal is approximately proportional to a second-order spatial derivative of the pressure field at a point intermediate the first and second locations, said point separated from said source along an axis to be referred to as the major axis;
CHARACTERIZED IN THAT:
  d) the first and second locations are separated at least along a minor axis perpendicular to the major axis;
  e) the sensing step is carried out such that each of the resulting first and second output signals is proportional to the first derivative of the pressure field along the minor axis, and the net output signal is approximately proportional to the second spatial derivative of the pressure field along the minor axis; and
  f) the first and second locations are so chosen that radially divergent acoustic signals emitted by the source contribute, to the net output signal, mutually reinforcing first and second output signals that are proportional to the first spatial derivative of the pressure field along the minor axis.

* * * * *